(12) United States Patent
Larson (10) Patent No.: US 10,029,614 B2
(45) Date of Patent: Jul. 24, 2018

(54) INTERIOR REARVIEW MIRROR ASSEMBLY

(71) Applicant: MAGNA MIRRORS OF AMERICA, INC., Holland, MI (US)

(72) Inventor: Mark L. Larson, Grand Haven, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 15/352,798

(22) Filed: Nov. 16, 2016

(65) Prior Publication Data

US 2017/0136949 A1    May 18, 2017

Related U.S. Application Data

(60) Provisional application No. 62/256,450, filed on Nov. 17, 2015.

(51) Int. Cl.
 *B60R 1/04* (2006.01)
(52) U.S. Cl.
 CPC ..................... *B60R 1/04* (2013.01)
(58) Field of Classification Search
 CPC ................. B60R 1/04; G02B 7/182
 USPC ..................... 359/871, 882, 883
 See application file for complete search history.

(56) References Cited

U.S. PATENT DOCUMENTS

| | | | |
|---|---|---|---|
| 4,457,586 A * | 7/1984 | Sharp | B60R 1/086 359/603 |
| 4,826,289 A | 5/1989 | Vandenbrink et al. | |
| 4,936,533 A | 6/1990 | Adams et al. | |
| 5,100,095 A | 3/1992 | Haan et al. | |
| 5,555,136 A | 9/1996 | Waldmann et al. | |
| 5,582,383 A | 12/1996 | Mertens et al. | |
| 5,680,263 A | 10/1997 | Zimmermann et al. | |
| 5,820,097 A | 10/1998 | Spooner | |
| 5,942,324 A * | 8/1999 | Chu | B29C 41/20 264/239 |
| 5,984,482 A | 11/1999 | Rumsey et al. | |
| 6,227,675 B1 | 5/2001 | Mertens et al. | |
| 6,229,319 B1 | 5/2001 | Johnson | |
| 6,315,421 B1 | 11/2001 | Apfelbeck et al. | |
| 6,318,870 B1 | 11/2001 | Spooner et al. | |
| 6,329,925 B1 | 12/2001 | Skiver et al. | |
| 6,439,755 B1 | 8/2002 | Fant, Jr. et al. | |
| 6,483,438 B2 | 11/2002 | DeLine et al. | |
| 6,501,387 B2 | 12/2002 | Skiver et al. | |
| 6,540,193 B1 | 4/2003 | DeLine | |
| 6,593,565 B2 | 7/2003 | Heslin et al. | |
| 6,690,268 B2 | 2/2004 | Schofield et al. | |
| 6,877,709 B2 | 4/2005 | March et al. | |
| 7,249,860 B2 | 7/2007 | Kulas et al. | |
| 7,255,451 B2 | 8/2007 | McCabe et al. | |

(Continued)

*Primary Examiner* — Frank Font
(74) *Attorney, Agent, or Firm* — Honigman Miller Schwartz and Cohn, LLP (57) ABSTRACT

An interior rearview mirror assembly for a vehicle includes a mirror reflective element and a mirror casing supporting the mirror reflective element. The mirror casing includes a synthesized ABS material having an additional styrene copolymer added to that of the native ABS in the polymerization process of the ABS material. The synthesized ABS may include a Hushlloy™ material. The mirror casing that is made of the synthesized ABS material may include a rear housing portion or a bezel.

20 Claims, 7 Drawing Sheets

(56) References Cited

U.S. PATENT DOCUMENTS

| | | |
|---|---|---|
| 7,289,037 B2 | 10/2007 | Uken et al. |
| 7,338,177 B2 | 3/2008 | Lynam |
| 7,360,932 B2 | 4/2008 | Uken et al. |
| 8,049,640 B2 | 11/2011 | Uken et al. |
| 8,277,059 B2 | 10/2012 | McCabe et al. |
| 8,508,831 B2 | 8/2013 | De Wind et al. |
| 8,529,108 B2 | 9/2013 | Uken et al. |
| 8,730,553 B2 | 5/2014 | De Wind et al. |
| 8,851,690 B2 | 10/2014 | Uken et al. |
| 9,174,578 B2 | 11/2015 | Uken et al. |
| 9,346,403 B2 | 5/2016 | Uken et al. |
| 9,475,431 B2 | 10/2016 | Brummel et al. |
| 9,598,016 B2 | 3/2017 | Blank et al. |
| 2013/0112836 A1 | 5/2013 | Rawlings |
| 2014/0133043 A1* | 5/2014 | Watson .................... B60R 1/04 359/872 |
| 2015/0097955 A1 | 4/2015 | De Wind et al. |

\* cited by examiner

INTERIOR REARVIEW MIRROR ASSEMBLY

CROSS REFERENCE TO RELATED APPLICATION

The present application claims the filing benefits of U.S. provisional application Ser. No. 62/256,450 filed Nov. 17, 2015, which is hereby incorporated herein by reference in its entirety.

FIELD OF THE INVENTION

The present invention relates generally to the field of interior rearview mirror assemblies for vehicles.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. Often, the plastic interfaces, such as between a bezel and mirror housing and/or between a bezel and glass reflective element, may cause a noise or squeak when the mirror assembly is adjusted, such as when a driver adjusts the mirror reflective element to provide a desired rearward field of view.

SUMMARY OF THE INVENTION

The present invention provides an interior rearview mirror assembly that comprises a mirror reflective element and a mirror casing, with at least a portion of the mirror casing (such as a mirror bezel) being formed of a synthesized ABS material having an additional styrene copolymer added to that of the native ABS in the polymerization process (whereby the synthesis process chemically bonds the additional styrene chain to that of the native ABS and in so doing permanently alters the stick-slip property of the new molecular compound while maintaining all of the original attributes of the native ABS). The synthesized ABS may comprise a Hushlloy™ material or the like. Optionally, the mirror casing (including a bezel and rear housing portion) may both be formed of the same synthesized ABS material, and optionally, the attachment plate that attaches or supports a printed circuit board in the mirror casing may also be formed of the same synthesized ABS material.

Therefore, the present invention provides an interior rearview mirror assembly that has substantially reduced noise or squeak over the life cycle of the mirror assembly in use in a vehicle.

These and other objects, advantages, purposes and features of the present invention will become apparent upon review of the following specification in conjunction with the drawings.

DESCRIPTION OF THE PREFERRED EMBODIMENTS

Figure 1:
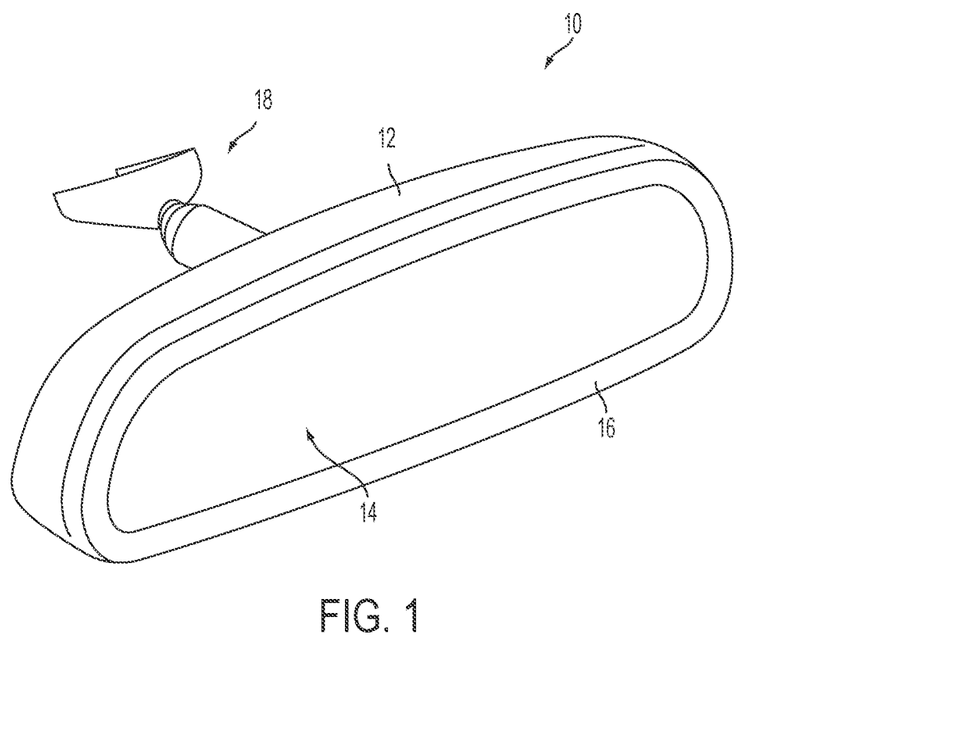
FIG. 1 is a perspective view of an interior rearview mirror assembly in accordance with the present invention.

Referring now to the drawings and the illustrative embodiments depicted therein, an interior rearview mirror assembly 10 for a vehicle includes a casing 12 and a reflective element 14 positioned at a front portion 16 (such as a bezel portion) of the casing 12 (FIG. 1). In the illustrated embodiment, mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 18.

Engineers working with plastic components have known for decades that audible noise can result from movement of materials against amorphous plastic components. This movement can be either intentional macro movement, such as hinges or sliding parts, or it can be microscopic unintentional movement, where there may be no visible sign or sensation of part movement. Audible noise can result from an infinite combination of materials, forces, speeds and surface area that define boundary conditions at the plastic interface.

There is probably no industry which appreciates this plastic interface noise phenomenon more than the automotive industry. An ever increasing percentage of a modern vehicle structural and decorative content is composed of plastic components. The plastic content of vehicles is most evident in the interior cabin, where the overwhelming majority of Class A surfaces are plastic. An equal and increasing amount of plastic structural components are also used behind the Class A skins which are seen and touched on a daily basis. Plastics are strong, light and increasingly in demand by automotive manufacturers who are looking to meet the ever increasing energy efficiency requirements imposed by various governing bodies around the world.

Consumers have grown accustomed to vehicles with increasing levels of sound dampening materials to isolate the interior driving cabin from road, engine, drivetrain and ambient environmental sounds. As the cabin of the vehicle becomes quieter, the vehicle occupants become more aware of noises which may have gone unnoticed or perhaps tolerated in older model vehicles. One automotive product which falls into this category of emerging noisy components is the automotive interior rearview mirror. The culprit in this case is rarely the result of road or engine vibration causing micro movement between components. Mirrors have been, for the most part, engineered to eliminate these buzzes or rattles that are induced by road vibrations and the like. Instead, the offending rearview mirror lies quiet for months on end until one day the environmental conditions align resulting in this seemingly quiet mirror making a squeaking noise when a user grasps the mirror to adjust the rearward image to his or her driving needs.

Most vehicle operators adjust their mirror when the engine is off or idling. These periods of time tend to be quieter in the vehicle allowing the user to focus on the fact that the seemingly benign interaction with the mirror resulted in this normally quiet mirror making an unappealing sound. Under the right conditions, some mirror adjustment squeaks can be repetitively reproduced if similar adjustment force is applied. In other cases, a disproportionately loud squeak is created upon initial mirror adjustment, but repetitive identical adjustment result in significantly lower or no sound at all. Both noise scenarios tend to be irritating to vehicle occupants even though the act of mirror adjustment represents an almost infinitesimally small percentage of the time spent in a vehicle. These mirror adjustment noises are problematic because they are intermittent, quite infrequent, are often related to specific environmental conditions and occur in a minority population of the mirror production.

The modern interior rearview mirror is typically made from glass, plastic and metal. Virtually all rearview mirrors utilize a plastic housing which can serve as a decorative or structural component of the mirror system. It is also very common for an interior rearview mirror to have a second functional piece of plastic which is typically referred to as a bezel. The bezel surrounds the glass reflective element and constrains it in the mirror system. The bezel and housing are in intimate contact with each other typically through a tongue and grove construction and molded snaps. The interaction of bezel and housing form a multitude of plastic on plastic interfaces with very tightly controlled mechanical fit to ensure smooth joints and tight structural support of the encased mirror reflective element.

Auto dimming mirrors are a very popular and common form of interior rearview mirror assemblies. The conventional auto dimming mirror contains an electrochromic variable reflective element, also referred to as an EC cell. An electronic control circuit inside the mirror analyzes the ambient lighting environment in which the vehicle is present and supplies power to the EC cell. When appropriate, the control circuit provides an electrical control signal to the electrochromic cell causing its optical path to darken and reduce the intensity of the reflective image to the driver. Such an electrochromic self-dimming mirror is commonly used to reduce headlight glare from vehicles behind the vehicle at night. The electrochromic cell is typically composed of two pieces of glass, various thin film metal and metal oxide conductive coatings, cured structural adhesives, metal contacts, cured conductive adhesives, solder and wires with insulation. By design, the plastic bezel is designed to touch or almost touch every one of these components and in doing such creates a plethora of plastic interface surfaces.

The bezel's primary function is to constrain the electrochromic cell so that it provides an optically stable reflected image to the driver's eyes and protects the driver from coming in contact with sharp glass edges and the electrification components. Every component of the electrochromic cell has its own individual manufacturing tolerance and an assembly tolerance as it is added to form the completed EC cell. The resulting tolerance stacks can cause contact or gaps between plastic and electrochromic component surfaces. Where there is contact, the force at the plastic interface can vary with the amount of interference. The two pieces of glass used to construct the EC cell are often formed by accurate glass cutting techniques. As a whole, pressure cutting of glass is very accurate but the actual edge quality of the cut can be unpredictable and have various types of micro imperfections. It is these micro imperfections that tend to dominate the mirror to mirror variation of plastic interfaces. The cut glass edge is a large contributor to the mechanical tolerance stack.

To complicate things even more, a rearview mirror is designed to operate over a wide range of environmental conditions. High and low temperatures can range from about −40 degrees Celsius to about +85 or even +105 degrees Celsius. Humidity can range from near zero to the opposite extreme where humidity is so high that it condenses on the mirror surface. The mirror is also subjected to very high solar loading resulting from its mounting location on or near the top windshield with direct view of the sky. Solar loading results in the black plastic, typical of most mirror housings, absorbing a large amount of visible and near infrared energy. As this solar energy is absorbed by the plastics and other black mirror surfaces, the temperatures of the materials increase and cause various degrees of materials expansion. Solar loading also subjects mirror plastics to a significant amount of UV energy which can degrade the surface appearance and mechanical properties of plastics over the life of the vehicle.

Temperature fluctuations result in the mirror's individual components expanding and contracting according to their respective coefficients of thermal expansion (CTE). Each material expands by differing percentages and thus the interface relationship between electrochromic cell components and plastics changes. Gaps at one temperature can turn into interference interfaces at another temperature and vice versa. Temperature related material properties such as Tg (Glass Transition Temperature, which is the temperature region where a polymer transitions from a hard, glassy material to a soft, rubbery material) impact the friction at plastic interfaces. Humidity can also have an effect on the dimensions of plastic components. Plastics absorb small percentages of water which in turn cause parts to expand or contract. As component sizes changes from humidity so do the clearances and interferences between the plastic and electrochromic mirror cell components.

Mirror manufacturers use great care in selecting the plastics that are used in mirror construction. Many plastic metrics need to be carefully understood, weighted and entered into consideration for determination of optimal plastic for use as housing and bezel. Every plastic has its own strengths and weaknesses for a specific application. Materials strength, impact resistance, color fastness, resistance to chemicals, resistance to UV degradation, glass transition temperature, weight, availability, number of sources, flammability and cost are just some of the metrics that are considered when selecting plastics that are used in an automotive rearview mirror assembly.

Increasingly, a more subtle metric important to audible performance—the metric of stick-slip sliding friction— needs to be considered. Stick-slip friction is a materials property which characterizes the friction forces between a plastic and other material sliding against each other. Stick-slip also occurs between plastics of the same type. Sliding forces are characterized with a tensile tester to accurately measure force vs time. Stick-slip sliding is characterized by a drop in friction force during the transition from static to kinetic conditions. In stick-slip sliding, friction changes rapidly, repeatedly grabbing and releasing as the parts move relative to one another. The amplitude of the force peaks and valleys has a direct relationship to the quantity and quality of noise produced. The larger the peak to peak difference, the more likely an objectionable audible noise will result. The load normal to the interface, stiffness of the connection, amount of surface contact, surface roughness, sliding speed, temperature and humidity all have a measureable impact on the audible sound produced between two materials. The release of energy in the transition from static to kinetic conditions results in local vibrations in the materials surface. Noise arises if the energy release is significant and the area under vibration is sufficiently large to generate audible sound. Typical mirror design leaves the mirror's relatively large housing undamped and well suited for amplifying generated sounds.

Two plastic materials have consistently demonstrated a good balance between metrics that mirror engineers weigh in making resin selection for molded plastic components. The first plastic for serious consideration is Acrylonitrile-Butadiene-Styrene (ABS). ABS is an amorphous material consisting of a two phase polymer blend. A continuous phase of styrene-acrylonitrile copolymer (SAN) gives the materials rigidity, hardness and heat resistance. The toughness of ABS is the result of submicroscopically fine polybutadiene rubber particles uniformly distributed in the SAN matrix. ABS is readily modified both by the addition of additives and by variation of the ratio of the three monomers Acrylonitrile, Butadiene and Styrene. The second plastic for consideration is polycarbonate (PC) which has excellent toughness, thermal stability and a very good dimensional stability making it one of the most widely used engineering thermoplastics. PC is also an amorphous material and falls into the polyester family of products. Polycarbonate maintains rigidity to high temperatures while at the same time offers high toughness at cold temperatures.

Optionally, and desirably, mirror housings and bezels may be manufactured from plastic that is an engineered blend of PC and ABS. PC-ABS is a plastic alloy that is created by manufacturing ABS and PC independently and then mechanically mixing them into a homogeneous solution as the injection molding pellets are extruded. PC-ABS is engineered to offer the most desirable properties of both materials. PC-ABS maintains the high strength and heat resistance of PC and the flexibility and lower cost of ABS. PC-ABS alloys are well suited for injection molding appearance related parts such as a mirror's Class A housing and bezel.

ABS, PC and PC-ABS blends are all plastics which score well for use as mirror housings and bezels when all metrics are weighed. However, all of these materials score poorly for the metric of stick-slip sliding friction. These plastics and plastic blends exhibit static friction values that will increase with time of static friction and drop in friction as sliding starts. The drop in friction force causes the slip-stick motion as discussed earlier. Thus, mirror assemblies molded from PC-ABS are at significant risk for making audible noise when they are grasped for adjustment.

In the search for solutions to plastic squeak, two countermeasures have been investigated. First, the assembly tolerances may be controlled to ensure predictable surface contact and interface force. Controlling assembly tolerances between the molded plastics and the electrochromic cell is extremely challenging. The fit between the EC cell and plastics needs to be simultaneously considered with the styling expectations and the required support of the reflector to ensure stable reflected image to the driver's eye. When making millions of mirrors a year, it only takes one or two having assembly tolerances outside of the acceptable range to create a mirror which squeaks when adjusted. Mirror design and manufacturing has improved both component and assembly tolerances to a point where it is impractical to improve them further without adding significant cost or manufacturing difficulty.

A second and less desirable method of improving audible squeaking and creaking is the addition of materials to the plastic interfaces in an attempt to alter or eliminate the slip-stick friction. Additional materials, such as flocking, felt, nonwoven cloth, high molecular weight plastic films or tapes, are all materials that are widely used in automotive plastic squeak mitigation. In mirror applications, these materials are extremely difficult to implement because of the compact nature of mirror packaging. In many cases there is just no physical room to add a noise mitigating material with a thickness of 200 μm without a complete redesign of the mirror system and revised Class A styling. These structural materials are also expensive and technically challenging to selectively apply to the mirror plastics.

With space being at a premium in ultra-compact mirror designs, it is desirable to provide materials that take up less space but still have significant influence over slip-stick friction at the plastic interfaces. Thin films of both dry and wet/fluid products can be added to these plastic surfaces forming the slip-stick interfaces. In most cases, the dry additives are either applied loosely or in a wet form to the plastic surface being targeted. Loose additives are undesirable because they remain mobile and are easily removed by light touch or vibration. Loose additives can also move from their targeted location to other unintended locations. Movement of these additives can be especially problematic if the particles have color and can be transferred to visible portions of the Class A surface or if they are electrically conductive and can migrate to the control electronics of an electrochromic cell causing short circuits or unintended electrical performance. Dry additives can be broken down into inorganic and organic types and are available in various particle sizes extending down to nanoparticles. For example, graphite, molybdenum disulphide and tungsten disulfide are three inorganic materials that have been used to disrupt the slip-stick interfaces of mirror plastics. A wide range of organic particles can also be engineered to serve as disruptive additive to the plastic slip-stick interface. One of the most well-known organic compounds is Polytetrafluoroethylene (PTFE) also known as Teflon™. The lubricating properties of PTFE nano particles are well known and can significantly reduce the slip-stick friction at plastic interfaces.

Dry additives can be more effective if they are applied using a wet solution. The wet solution usually consists of a solvent or solvents, combined with a small amount of polymer binder and small or nano size particles of additive in suspension. The solvent serves as a carrier system for selective application of the additive particles to the targeted interface locations on the plastic part. The solvent carrier system needs to be chemically friendly with the host plastic to which the additive is being applied. Both PC and ABS tend to have fair to poor chemical sensitivity to many solvents. Proper solvent selection is extremely critical with limited choices. The small amount of polymer binder in solution is designed to fix the additive particles to the plastic, effectively gluing them in place. MAC-444NPB from McGee Industries, Inc.—McLube Division (Aston Pa., USA) is a fluoropolymer dispersion in a solvent applicator vehicle that has been shown to be beneficial in short term mitigation of stick-slip noise at plastic bezel to EC cell interfaces. The long term wear durability of MAC-444NPB has not yet been studied. A polymer binder helps fasten the McLube fluoropolymer particles to the plastic surface. MAC-444NPB does alter the gloss and leaves a slight haze on Class A surfaces of black textured mirror bezel so great care needs to be used in its application. Archoil (Oxford Conn., USA) AR2400 $WS_2$ Industrial Dry Film Spray deposits tungsten disulfide nanoparticle on surfaces using a solvent delivery vehicle. The AR2400 theoretically does not leave anything other than the dark $WS_2$ on the plastic surface but testing has shown that solvent delivery vehicle still appears to result in gloss and haze affects in Class A surfaces if it comes in contact with them. The Archoil product showed improved stick-slip performance over untreated plastic but did not appear to be as beneficial as the McLube fluoropolymer. Unintentional application of wet systems to plastic parts with adjacent targeted and Class A surfaces is extremely challenging. In the mirror bezel application, the Class A surface and targeted areas are immediately adjacent to each other. The textured bezel Class A surface joins the targeted additive surface of the mirror bezel at a 90 degree plastic corner. An application this precise poses a significant challenge. The solvents and or binder on Class A surfaces will almost always result in a gloss change or even worse a slight hazing or whitening of the black plastic.

Another form of thin slip-stick countermeasure consists of an additive material that is applied wet or semi solid and maintains these characteristics for extended periods of time. These materials or compounds are generally considered oils or greases depending on their viscosity or chemical composition. Oils and greases are most commonly mineral or vegetable oil based with evaporation and decomposition characteristics that span a wide range of temperatures. There are many challenges associated with application, handling and assembly of Class A plastic parts with wet lubricants added to selective surfaces. It is very easy to contaminate operator's hands, clothing or assembly fixtures with wet lubricants. These contaminated surfaces then unintentionally transfer large or small amounts of material to areas of Class A importance. Most automotive OEMs and their customers find it unacceptable to have grease on Class A surfaces. Greases and oils can also move by themselves though gravity or surface tension migration. Some greases or oils may have lower viscosity additives that can separate form more viscous components and result in a leaching or bleeding onto adjacent surfaces. This mode of failure can be highly unappealing because it often takes heat and time for these lubricants to migrate out of their intended locations and may happen long after the end customer has taken ownership of a new automobile. It is unacceptable to have oily substances moving by themselves onto the optical surface of the mirror where they impair the use of the mirror function.

Wet additives allow dust and other particles to stick in locations they may not normally. Such contaminants may result in electrical short circuiting or unexpected abrasion problems over the life of the vehicle. Some of the best performing lubricants tend to be expensive and often manufactured with silicone or fluorinated chemicals; one well known such product goes by the trade name of Krytox™. Krytox™ grease and oils are manufactured by Chemours USA Fluoroproducts a DuPont Subsidiary (Wilmington Del., USA). Krytox™ is a fluorocarbon polymer of polyhexafluoropropylene oxide also known as perfluoropolyether (PFPE). Fuchs Lubritech GMBH (Hilden, Germany) manufactures several invisible fluorinated lubricants that are applied using water or solvent based delivery vehicles. Fuchs Lubritech XTR5-50F, KSP-115, and DL 500 W are various forms of wet lubricants which are applied using a secondary liquid delivery vehicles which are designed to evaporate leaving an ultra-thin film of invisible wet lubricant behind. Overall, the application of wet additives to slip-stick interfaces of a mirror is a poor and impractical choice. Waxes are a relative to grease and oil but with harder, less likely to migrate mechanical properties. The long term wear durability of waxes is questionable because of their tendency to abrade over time. Waxes negatively impact Class A surface gloss making it noticeably higher and less acceptable.

Another slip-stick friction countermeasure may include the incorporation of "additives" to the actual injection molding resin which reduce the slip-stick friction characteristics of the molded part. Additives are materials in suspension within the bulk polymer they are not typically synthesized to intimately link to the host polymer chains. Resin additives fall into two types, silicones and fluorinated or crystalline polymer nanoparticle. Neither of these modified resins is suitable for painting or plating and thus they have limited utility for making Class A molded plastics. The inability to paint a plastic poses a significant problem for automotive suppliers because many Class A plastics require painting to achieve the final surface finish required by the automotive customer. Paintability of interior rearview mirror housings and bezels is not a significant consideration. The overwhelming majority of mirrors use molded in color with less than one percent actually requiring a painted surface.

Some slip-stick additives such as PTFE nano particles can be added, as a colorant would be, to an existing injection molding resin of choice. Shamrock Technologies (Newark N.J., USA) NanoFLON® or FLT engineered PTFE powders are products that fall into this category of resin additive. However, PTFE tends to be light in color and when significant percentages are added to resins it becomes increasingly difficult to achieve a specific black molded-in color and acceptable surface finish. PTFE nano products are also expensive because of their base chemistry and highly specialized processing required to create the nano particles. Resins incorporating such additives are usually characterized as engineered polymer systems, which are manufactured specifically by the resin manufacturer as an anti-squeak or wear resistant polymer. There is a fairly limited selection of these anti-squeak polymers commercially available. They are considered specialty products and tend to be cost prohibitive for mirror or Class A applications.

Silicones are another form of additive that has been used in injection molding resins to decrease slip-stick friction noise. Silicone additives are typically only added to resins by the actual resin manufacturer because of the micro dispersion requirements for this type of additive. Plastic parts molded with resins incorporating silicone additives cannot be plated or painted. Theses specialty resins are significantly limited in use for automotive applications because of their inability to be decorated. Silicone additives also tend to create stick-slip interfaces which change with time and temperature. The stick-slip friction characteristics can look very good for a freshly molded part but over time these characteristics can degrade significantly due to the mobile nature of the silicone and its ability to migrate or evaporate from the interface. Inconsistent stick-slip friction characteristics are not a favorable attribute for an automotive plastic part that has a designed service lifetime of 15 years and is subjected to fairly extreme temperatures (about −40 degrees C. to about +85 degrees C.) for extended periods of time.

It is obvious from the discussions above that a cost effective and elegant solution for interior rearview mirror plastic squeak is not easily achieved or well known to mirror engineers. Stick-slip squeak has been, and continues to be, a quality irritant that arises unexpectedly in even the best controlled mirror manufacturing situations. However, the present invention provides a robust solution that will substantially or permanently eliminate the fundamental root cause of plastic squeak noise. The solution involves the use of a novel plastic that has been modified at the molecular level to permanently and dramatically alter the stick-slip friction characteristics of the amorphous polymer itself. A new ABS polymer composition has been developed with significantly reduced stick-slip friction that virtually eliminates plastic squeak noise. The key to this new form of ABS is the addition of an additional styrene copolymer to that of the native ABS in the polymerization process. The synthesis process chemically bonds the additional styrene chain to that of the native ABS and in so doing permanently alters the stick-slip property of the new molecular compound while maintaining all of the original attributes of the native ABS.

ABS is by design a terpolymer made by polymerizing monomers of styrene and acrylonitrile in the presence of polybutadiene. The newly synthesized ABS with an additional styrene copolymer has been developed by Techno Polymer Co., Ltd. (Tokyo, Japan). Techno Polymer has created a family of ABS and PC-ABS alloys covered by the trade name Hushlloy™. The Hushlloy™ family of resins all have exceptionally small stick-slip friction compared to conventional PC/ABS resins. To create a Hushlloy™ PC-ABS alloy, the styrene modified ABS is blended with polycarbonate based on conventional molecular composition. The resulting alloy has stick-slip properties which are dominated by the anti-squeaking ABS. Techno Polymer currently makes two PC-ABS alloys that are suitable for use in mirror bezels and housings. HS210 and HS510 are both Hushlloy™ PC-ABS blends having similar mechanical properties. HS210 is a PC/ABS blend which has high heat resistance. HS210 has similar mechanical properties to the conventional PC/ABS material that is now used to make mirror bezels and housings. HS510's unique attribute is that it is designed to produce a low gloss molded surface while HS210 is designed to have a higher heat deflection temperature. The present invention utilizes either of these Hushlloy™ products (or other suitable synthesized ABS) for molding the mirror bezel and/or housing. Ultimately our customer's gloss preference may determine which version is most applicable. Automotive customers lean heavily towards Class A molded plastics that have as low a gloss as possible.

Figure 2:
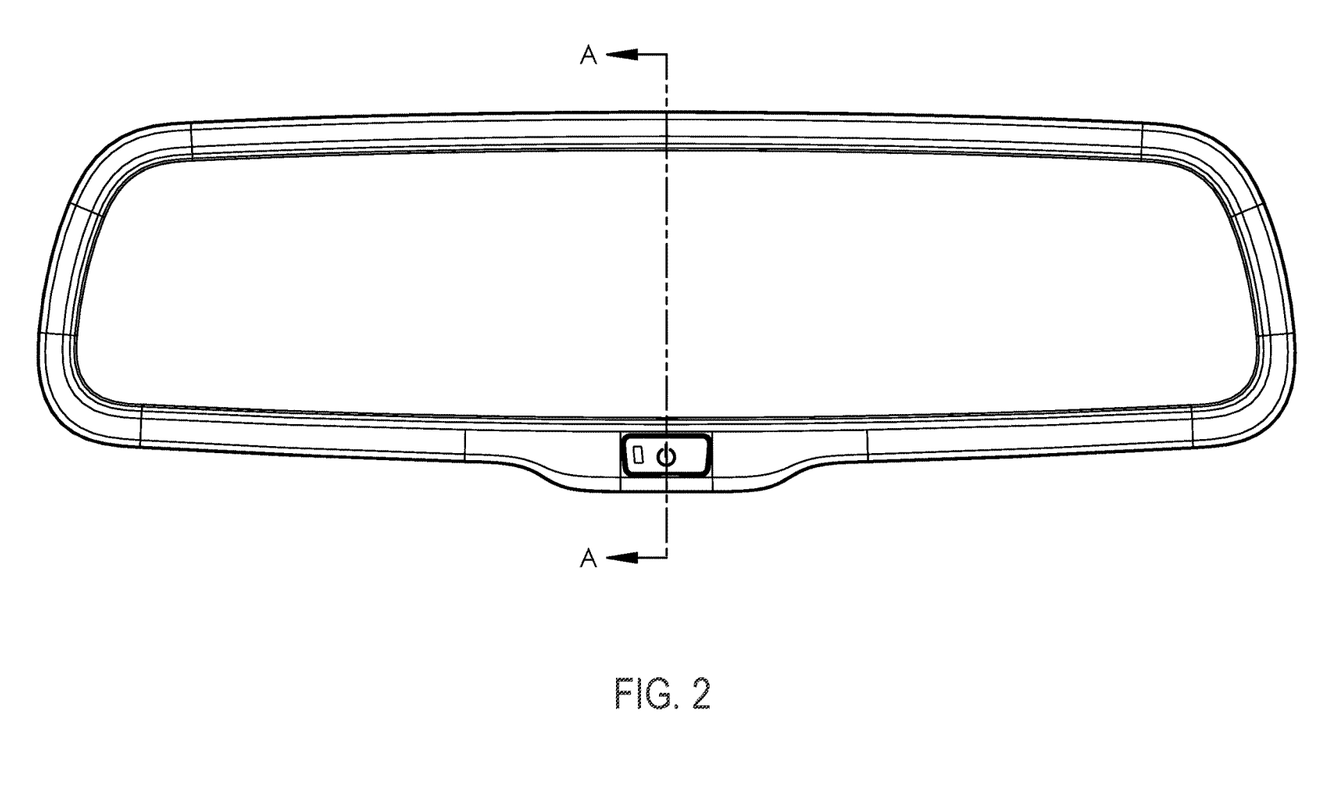
FIG. 2 is a plan view of a mirror assembly with a mirror casing and bezel construction.
Figure 2A:
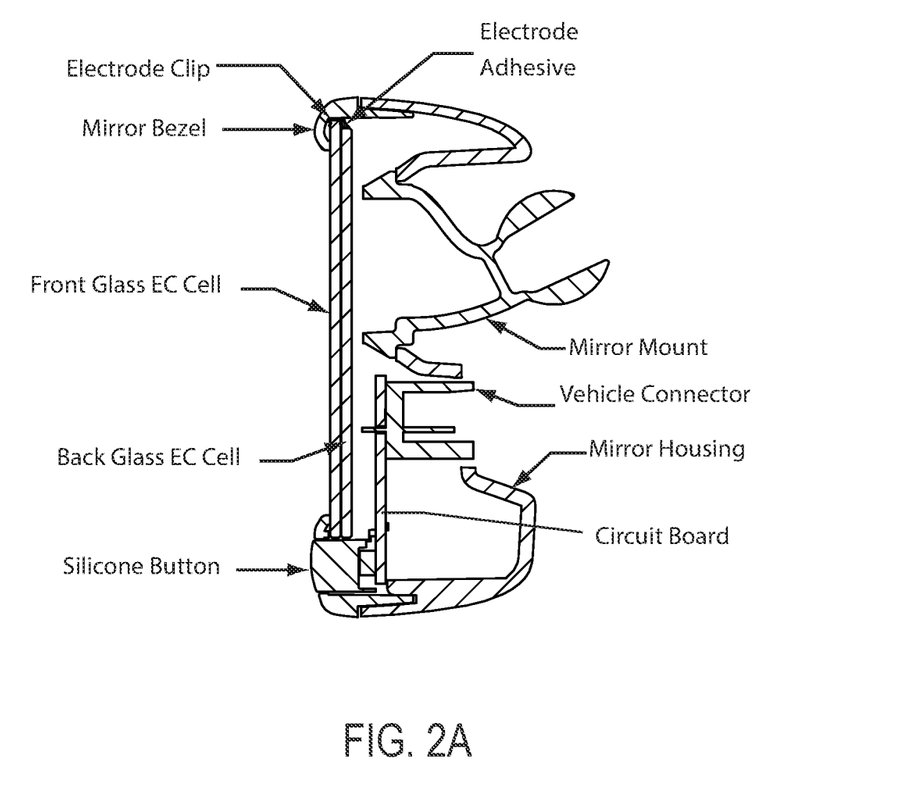
FIG. 2A is a sectional view of the mirror assembly of FIG. 2, taken along the line A-A in FIG. 2.
Figure 2B:
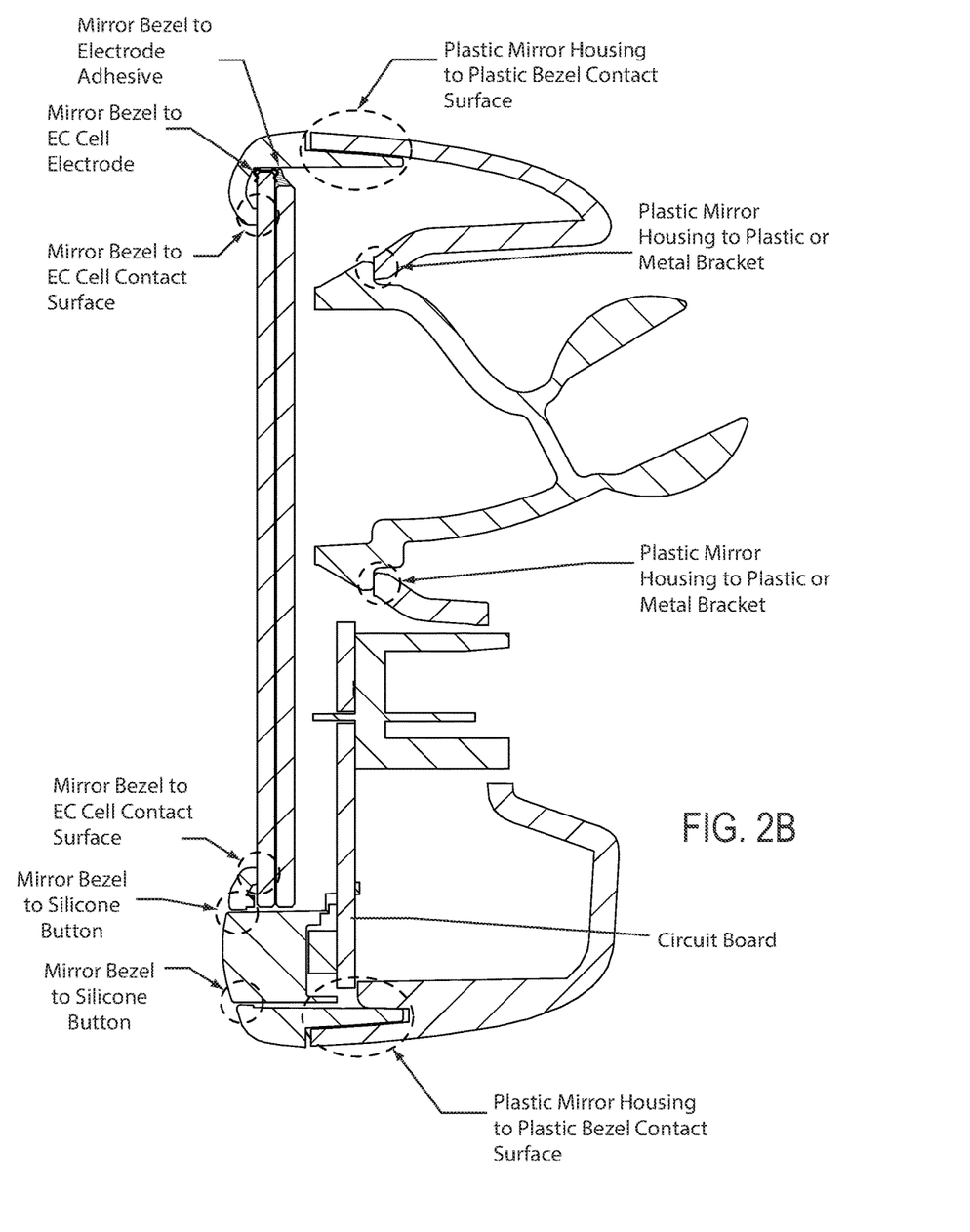
FIG. 2B is another sectional view of the mirror assembly, showing areas of potential noise concerns at interfaces of the plastic and glass components of the mirror assembly.
Figure 3:
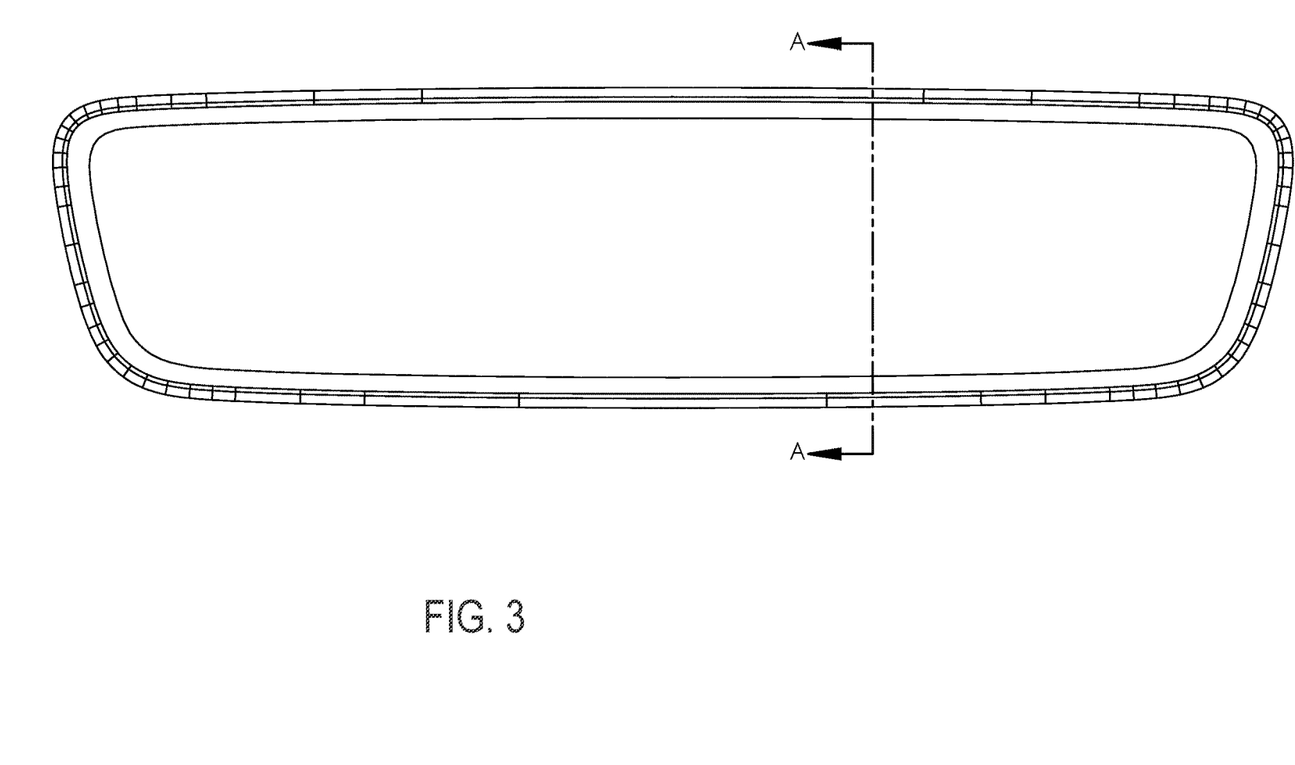
FIG. 3 is a plan view of a mirror assembly with a frameless mirror construction.
Figure 3A:
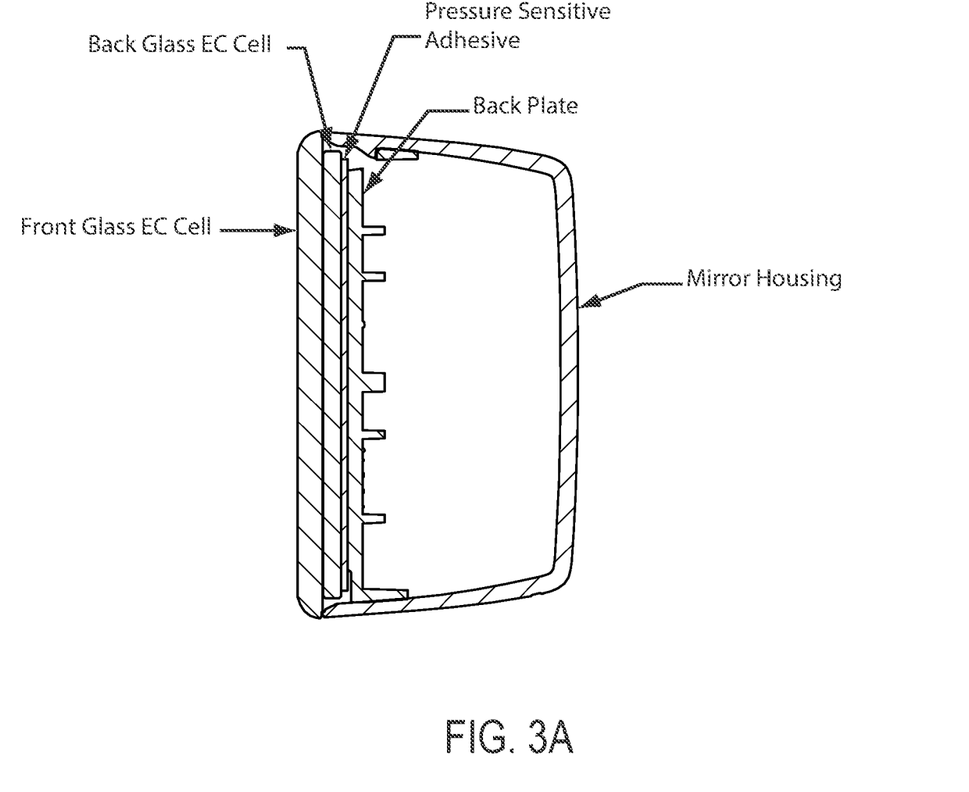
FIG. 3A is a sectional view of the mirror assembly of FIG. 3, taken along the line A-A in FIG. 3.
Figure 3B:
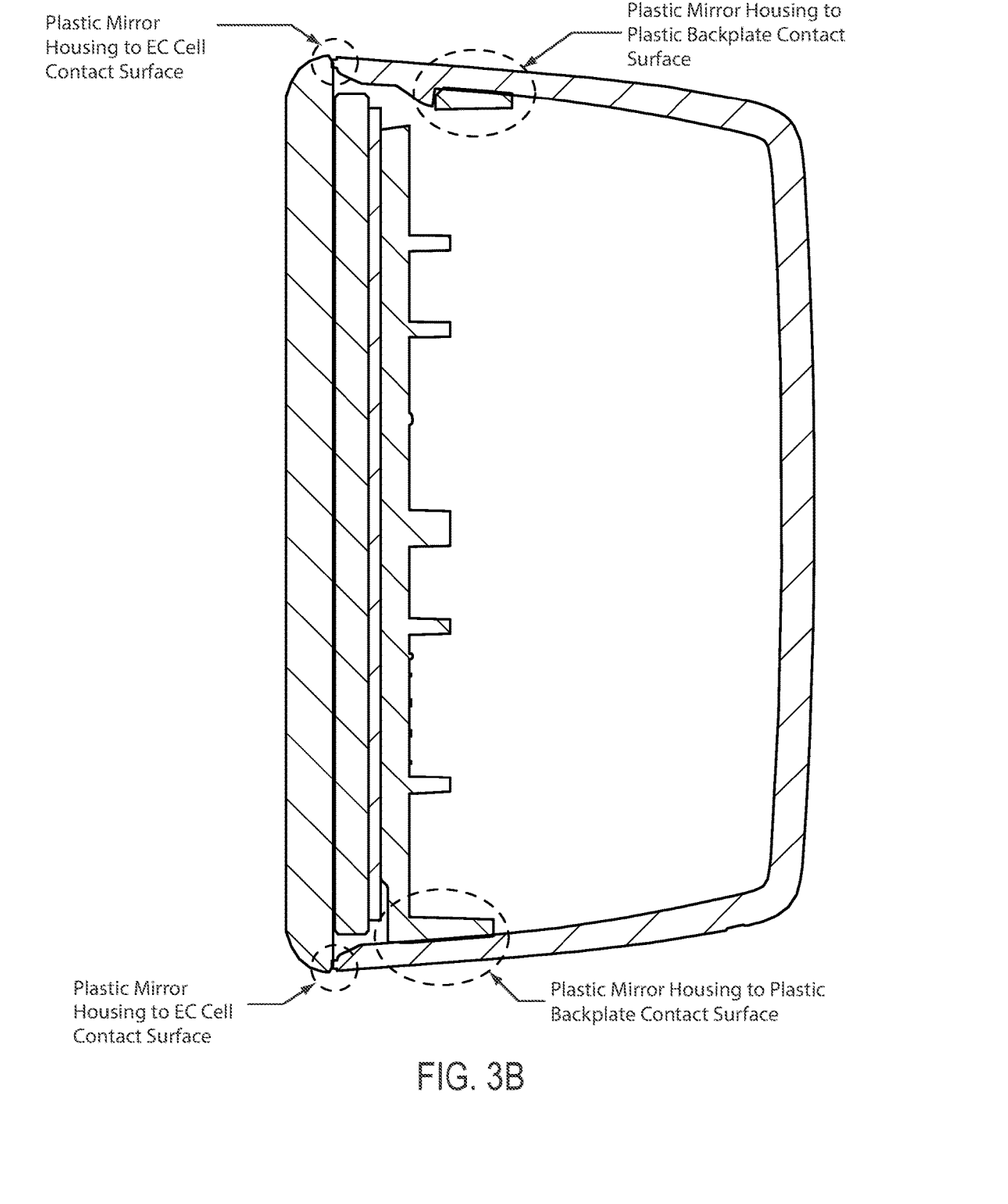
FIG. 3B is another sectional view of the mirror assembly, showing areas of potential noise concerns at interfaces of the plastic and glass components of the mirror assembly.

Optionally, it is desirable to make the mirror housing and bezel or the mirror housing and back plate both from Hushlloy™. As can be seen with reference to FIGS. 2, 2A, 2B, 3, 3A, 3B, there are many areas or regions of different mirror designs (such as frameless mirrors, such as shown in FIGS. 3, 3A, 3B, and bezel mirrors, such as shown in FIGS. 2, 2A, 2B) that can potentially touch and thus make slip stick squeak when the mirror is grasped for adjustment, is adjusted or when a button of the mirror is pushed. For example, and such as shown in FIG. 2B, the interfaces between the bezel and (i) the glass substrate of the EC cell, (ii) the EC cell electrode, (iii) the electrode adhesive, (iv) a mirror button, such as a silicone button, and/or (v) the mirror housing, may have squeak concerns. Likewise, the interfaces between the mirror housing and (i) the bezel and (ii) the plastic or metal pivot element or bracket may also or otherwise have squeak concerns. Also, and such as shown in FIG. 3B, the interfaces between the mirror housing and (i) the glass surface of the front glass substrate and (ii) the plastic backplate contact surfaces may have squeak concerns.

In an ideal world, where cost is not a consideration, the anti-squeak solution would be to mold both mirror housing and bezel from the same Hushlloy™ resin. These two plastic components are physically adjacent to each other and experience similar solar loading and operator handling. Automotive customers are very concerned that the gloss and color of these two plastic components match well at the time of manufacture and through the weathering process over the life of the vehicle. Molding both components from the same resin maximizes the opportunity to appearance tracking over vehicle life.

For a mirror application the slip-stick characteristics of the bezel are most important. The bezel (such as shown in FIGS. 2, 2A, 2B) comes in intimate contact with all of the electrochromic cell's varying materials and tolerances that can create local interface problems. The bezel also comes in contact with the mirror housing in many snap and alignment points. For these reasons, the mirror bezel is the prime candidate for a low stick-slip plastic material. The mirror's bezel is the lighter of the two molded components so the cost premium of an anti-squeak polymer is minimized if the bezel is converted to Hushlloy™ and the housing is left as a conventional PC-ABS. The headaches of using different bezel and housing molding resins may not be worth the effort of trying to make them match in appearance through weathering.

In some mirror designs the housing can be a contributor to stick-slip noise at the point where the mirror's mounting bracket attaches to the mirror housing (see FIG. 2B). This mechanical interface is independent of the bezel and must be addressed through use of a Hushlloy™ molded housing. Some mirrors have switches with decorated key tops used to activate various electrical functions within the mirror or other systems in the vehicle. These key tops (see FIG. 2B) are often molded from silicone rubber with silicone ink and polyurethane surface coating to maximize durability and appearance. Under certain conditions the key top's interface to mirror housing or bezel plastics make squeaking noises during button presses. The button on plastic squeak can be eliminated by converting the mirror structural plastics to Hushlloy™ polymers. In yet other mirror designs, a plastic structure or backplate or attachment plate (see FIG. 3B) is bonded to the back of the electrochromic cell to support and locate the printed circuit board used to electrically control the EC cell. In certain circumstances audible creaking noise can be created between the circuit board and the attachment plate during rough handling or adjustment of the mirror. Such creaking noise can be eliminated by using a Hushlloy™ molded attachment plate to minimize the slip-stick friction at the snap and support interfaces to the PCB.

Styrene copolymer modified ABS resin is the key to permanently solving plastic stick-slip squeak noise in automotive interior rearview mirrors. The use of this new polymer formulation for molded mirror plastics provides a novel and revolutionary method of addressing this annoyance noise that has plagued automotive mirrors for decades. Mirror adjustment plastic squeak is becoming a larger concern with the emergence of quiet electric vehicles and improved acoustically isolated vehicle cabins. A Hushlloy™ molded plastic mirror bezel addresses the majority of plastic adjustment noise but best results are obtained by converting all three main plastic mirror components (bezel, housing and attachment plate) to a low stick-slip polymer formulation from Techno Polymer.

Therefore, the present invention provides an interior rearview mirror comprising a mirror reflective element and a mirror casing, with at least a portion of the mirror casing (such as a mirror bezel) being formed of a synthesized ABS material having an additional styrene copolymer added to that of the native ABS in the polymerization process (whereby the synthesis process chemically bonds the additional styrene chain to that of the native ABS and in so doing permanently alters the stick-slip property of the new molecular compound while maintaining all of the original attributes of the native ABS). The synthesized ABS may comprise a Hushlloy™ material or the like. Optionally, the mirror casing (including a bezel and rear housing portion) may both be formed of the same synthesized ABS material, and optionally, the attachment plate that attaches or supports a printed circuit board in the mirror casing may also be formed of the same synthesized ABS material. The portion of the mirror assembly that is made from the synthesized ABS material may be selected by the number of contact points or surfaces with other materials (i.e., the number of potential squeak concerns) and/or the severity of or intensity of the potential squeaks at the contact points or surfaces.

The reflective element and mirror casing are adjustable relative to a base portion or mounting assembly to adjust the driver's rearward field of view when the mirror assembly is normally mounted at or in the vehicle. The mounting assembly may comprise a single-ball or single-pivot mounting assembly, whereby the reflective element and casing are adjustable relative to the vehicle windshield (or other interior portion of the vehicle) about a single pivot joint, or the mounting assembly may comprise other types of mounting configurations, such as a double-ball or double-pivot mounting configuration or the like, while remaining within the spirit and scope of the present invention. The socket or pivot element is configured to receive a ball member of the base portion, such as for a single pivot or single ball mounting structure or a double pivot or double ball mounting structure or the like (such as a pivot mounting assembly of the types described in U.S. Pat. Nos. 8,851,690; 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, which are hereby incorporated herein by reference in their entireties).

The mounting base includes an attaching portion that is configured to be attached to an interior surface of a vehicle windshield (such as to a mounting button or attachment element adhered to the interior surface of the vehicle windshield or such as to a headliner or overhead console of the vehicle). The mounting base may comprise a metallic ball portion or may comprise a molded (such as injection molded) polymeric mounting base or may be otherwise formed, depending on the particular application of the mirror assembly.

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/or 8,529,108, or such as a mirror assembly having a rear substrate of an electro-optic or electrochromic reflective element nested in the mirror casing, and with the front substrate having exposed curved or beveled perimeter edges, or such as a mirror assembly having a prismatic reflective element that is disposed at an outer perimeter edge of the mirror casing and with the prismatic substrate having exposed curved or beveled perimeter edges, such as described in U.S. Des. Pat. Nos. D633,423; D633,019; D638,761 and/or D647,017, and/or International Publication Nos. WO 2010/124064; WO 2011/044312; WO 2012/051500; WO 2013/071070 and/or WO 2013/126719, which are hereby incorporated herein by reference in their entireties (and with electrochromic and prismatic mirrors of such construction are commercially available from the assignee of this application under the trade name INFINITY™ mirror).

The mirror reflective element may comprise a laminate construction variable reflectance electro-optic (such as electrochromic) reflective element assembly having a front substrate and a rear substrate with an electro-optic medium (such as electrochromic medium) sandwiched therebetween and bounded by a perimeter seal. The mirror reflector may comprise any suitable coatings or layers, such as a transflective coating or layer, such as described in U.S. Pat. Nos. 7,626,749; 7,274,501; 7,255,451; 7,195,381; 7,184,190; 6,690,268; 5,140,455; 5,151,816; 6,178,034; 6,154,306; 6,002,511; 5,567,360; 5,525,264; 5,610,756; 5,406,414; 5,253,109; 5,076,673; 5,073,012; 5,115,346; 5,724,187; 5,668,663; 5,910,854; 5,142,407 and/or 4,712,879, which are hereby incorporated herein by reference in their entireties, disposed at the front surface of the rear substrate (commonly referred to as the third surface of the reflective element) and opposing the electro-optic medium, such as an electrochromic medium disposed between the front and rear substrates and bounded by the perimeter seal (but optionally, the mirror reflector could be disposed at the rear surface of the rear substrate (commonly referred to as the fourth surface of the reflective element), while remaining within the spirit and scope of the present invention).

Optionally, the mirror assembly may comprise a prismatic reflective element, while remaining within the spirit and scope of the present invention. The prismatic mirror assembly may be mounted or attached at an interior portion of a vehicle (such as at an interior surface of a vehicle windshield) via the mounting means described above, and the reflective element may be toggled or flipped or adjusted between its daytime reflectivity position and its nighttime reflectivity position via any suitable toggle means, such as by utilizing aspects of the mirror assemblies described in U.S. Pat. Nos. 6,318,870 and/or 7,249,860, and/or U.S. Publication No. US-2010-0085653, which are hereby incorporated herein by reference in their entireties. Optionally, for example, the interior rearview mirror assembly may comprise a prismatic mirror assembly, such as the types described in U.S. Pat. Nos. 7,289,037; 7,249,860; 6,318,870; 6,598,980; 5,327,288; 4,948,242; 4,826,289; 4,436,371 and/or 4,435,042, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,289,037; 7,274,501; 7,249,860; 7,338,177 and/or 7,255,451, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319 and/or 6,315,421 (which are hereby incorporated herein by reference in their entireties), that can benefit from the present invention.

The mirror assembly may comprise or utilize aspects of other types of casings or the like, such as described in U.S. Pat. Nos. 9,475,431; 7,338,177; 7,289,037; 7,249,860; 6,439,755; 4,826,289 and/or 6,501,387, which are all hereby incorporated herein by reference in their entireties, without affecting the scope of the present invention. For example, the mirror assembly may utilize aspects of the flush or frameless or bezelless reflective elements described in U.S. Pat. Nos.

7,626,749; 7,360,932; 7,289,037; 7,255,451; 7,274,501 and/or 7,184,190, which are all hereby incorporated herein by reference in their entireties.

Optionally, the mirror assembly may comprise a modular mirror construction, and may include back housing portions or the like, such as cap portions of the types described in U.S. Pat. No. 7,289,037, which is hereby incorporated herein by reference in its entirety. Optionally, the mirror casing and/or reflective element may include customized or personalized viewable characteristics, such as color or symbols or indicia selected by the vehicle manufacturer or owner of the vehicle, such as the customization characteristics described in U.S. Pat. Nos. 7,626,749; 7,255,451 and/or 7,289,037, which are hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. An interior rearview mirror assembly for a vehicle, said interior rearview mirror assembly comprising:
   a mirror reflective element;
   a mirror casing supporting said mirror reflective element; and
   wherein said mirror casing comprises a synthesized ABS material having an additional styrene copolymer added to that of a native ABS in a polymerization process of the ABS material.

2. The interior rearview mirror assembly of claim 1, wherein the synthesized ABS material comprises a Hushlloy™ material.

3. The interior rearview mirror assembly of claim 1, wherein the synthesized ABS material comprises a HS210 PC/ABS blend material.

4. The interior rearview mirror assembly of claim 1, wherein the synthesized ABS material comprises a HS510 PC/ABS blend material.

5. The interior rearview mirror assembly of claim 1, wherein said mirror casing comprises a bezel portion of said mirror assembly, and wherein said bezel portion comprises the synthesized ABS material.

6. The interior rearview mirror assembly of claim 1, wherein said mirror casing comprises a rear housing portion that houses at least one accessory of said interior rearview mirror assembly, and wherein said rear housing portion comprises the synthesized ABS material.

7. The interior rearview mirror assembly of claim 1, comprising a circuit board disposed in said mirror casing.

8. The interior rearview mirror assembly of claim 7, wherein said circuit board is supported at an attachment plate in said mirror casing.

9. The interior rearview mirror assembly of claim 8, wherein said attachment plate comprises a synthesized ABS material having an additional styrene copolymer added to that of a native ABS in a polymerization process of the ABS material.

10. The interior rearview mirror assembly of claim 9, wherein the synthesized ABS of said attachment plate comprises a Hushlloy™ material.

11. An interior rearview mirror assembly for a vehicle, said interior rearview mirror assembly comprising:
    a mirror reflective element;
    a mirror casing supporting said mirror reflective element, said mirror casing comprising a rear housing portion and a bezel portion; and
    wherein at least one of said rear housing portion and said bezel portion comprises a synthesized ABS material having an additional styrene copolymer added to that of a native ABS in a polymerization process of the ABS material.

12. The interior rearview mirror assembly of claim 11, wherein the synthesized ABS material comprises a Hushlloy™ material.

13. The interior rearview mirror assembly of claim 11, wherein said bezel portion comprises the synthesized ABS material.

14. The interior rearview mirror assembly of claim 13, wherein said rear housing portion comprises the synthesized ABS material.

15. The interior rearview mirror assembly of claim 11, wherein said rear housing portion comprises the synthesized ABS material.

16. The interior rearview mirror assembly of claim 11, comprising a circuit board disposed in said mirror casing, wherein said circuit board is supported at an attachment plate in said mirror casing.

17. The interior rearview mirror assembly of claim 16, wherein said attachment plate comprises a synthesized ABS material having an additional styrene copolymer added to that of a native ABS in a polymerization process of the ABS material.

18. The interior rearview mirror assembly of claim 17, wherein the synthesized ABS of said attachment plate comprises a Hushlloy™ material.

19. An interior rearview mirror assembly for a vehicle, said interior rearview mirror assembly comprising:
    a mirror reflective element;
    a mirror casing supporting said mirror reflective element;
    wherein said mirror casing comprises a rear housing portion that houses at least one accessory of said interior rearview mirror assembly, wherein a portion of said rear housing portion engages a glass surface of said mirror reflective element;
    a circuit board supported at an attachment plate disposed in said rear housing portion of said mirror casing, and wherein said attachment plate attaches at said rear housing portion of said mirror casing; and
    wherein at least one of said rear housing portion and said attachment plate comprises a synthesized ABS material having an additional styrene copolymer added to that of a native ABS in a polymerization process of the ABS material.

20. The interior rearview mirror assembly of claim 19, wherein the synthesized ABS material comprises a Hushlloy™ material.

* * * * *